United States Patent
Hahn

(10) Patent No.: US 11,889,572 B2
(45) Date of Patent: *Jan. 30, 2024

(54) METHOD FOR TRANSMITTING AND RECEIVING CONTROL INFORMATION INCLUDING CONFIGURATION INFORMATION FOR TRANSMISSION AND RECEPTION IN COMMUNICATION SYSTEM SUPPORTING VEHICLE-TO-EVERYTHING COMMUNICATION AND APPARATUS FOR THE SAME

(71) Applicants: Hyundai Motor Company, Seoul (KR); Kia Corporation, Seoul (KR)

(72) Inventor: Gene Back Hahn, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/091,771

(22) Filed: Dec. 30, 2022

(65) Prior Publication Data

US 2023/0146919 A1 May 11, 2023

Related U.S. Application Data

(63) Continuation of application No. 17/172,633, filed on Feb. 10, 2021, now Pat. No. 11,576,220, which is a (Continued)

(30) Foreign Application Priority Data

Jan. 10, 2019 (KR) .................. 10-2019-0003452

(51) Int. Cl.
*H04W 4/40* (2018.01)
*H04W 76/27* (2018.01)
(Continued)

(52) U.S. Cl.
CPC ............. *H04W 76/14* (2018.02); *H04L 67/12* (2013.01); *H04W 4/40* (2018.02); (Continued)

(58) Field of Classification Search
CPC ................. H04W 76/14; H04W 4/40 (Continued)

(56) References Cited

U.S. PATENT DOCUMENTS 10,952,266 B2 3/2021 Hahn
2017/0048905 A1 2/2017 Yun et al.
(Continued)

FOREIGN PATENT DOCUMENTS

EP 3255950 A1 12/2017
WO 2016/186059 A1 11/2016
WO 2017/126266 A1 7/2017

OTHER PUBLICATIONS

Extended European Search Report for Application No. 21190466.9, dated Dec. 3, 2021, 12 pages.
(Continued)

*Primary Examiner* — Angel T Brockman
(74) *Attorney, Agent, or Firm* — Fox Rothschild LLP

(57) ABSTRACT

An operation method of a first communication node in a vehicle-to-everything (V2X) communication system may include: receiving, by the first communication node, control information including resource allocation information from a second communication node; receiving, by the first communication node, data from the second communication node through a radio resource indicated by the resource allocation information included in the control information; generating, by the first communication node, sidelink control information (SCI) including reception configuration information indicating the radio resource used for transmission of the data by the second communication node based on the
(Continued)

resource allocation information; and transmitting, by the first communication node, the SCI to a third communication node.

17 Claims, 7 Drawing Sheets

Related U.S. Application Data continuation of application No. 16/257,372, filed on Jan. 25, 2019, now Pat. No. 10,952,266.

(60) Provisional application No. 62/654,827, filed on Apr. 9, 2018, provisional application No. 62/623,758, filed on Jan. 30, 2018.

(51) Int. Cl.
| | | |
|---|---|---|
| *H04W 88/04* | (2009.01) | |
| *H04W 76/14* | (2018.01) | |
| *H04L 67/12* | (2022.01) | |
| *H04W 72/20* | (2023.01) | |
| *H04W 72/23* | (2023.01) | |
| *H04W 72/0453* | (2023.01) | |
| *H04W 4/70* | (2018.01) | |

(52) U.S. Cl.
CPC ....... *H04W 72/0453* (2013.01); *H04W 72/20* (2023.01); *H04W 72/23* (2023.01); *H04W 76/27* (2018.02); *H04W 88/04* (2013.01); *H04W 4/70* (2018.02)

(58) Field of Classification Search
USPC .......................................... 370/329
See application file for complete search history.

(56) References Cited

U.S. PATENT DOCUMENTS

2017/0290034 A1   10/2017   Desai et al.
2018/0035276 A1    2/2018   Kang et al.

OTHER PUBLICATIONS (2018) 3rd Generation Partnership Project; Technical Specification Group Radio Access Network; Evolved Universal Terrestrial Radio Access (E-UTRA); Multiplexing and Channel Coding (Release 15), 3GPP TS 36.212 V15.0.1, 12 pages.

METHOD FOR TRANSMITTING AND RECEIVING CONTROL INFORMATION INCLUDING CONFIGURATION INFORMATION FOR TRANSMISSION AND RECEPTION IN COMMUNICATION SYSTEM SUPPORTING VEHICLE-TO-EVERYTHING COMMUNICATION AND APPARATUS FOR THE SAME

CROSS-REFERENCES TO RELATED APPLICATIONS

This Application is a Continuation of application Ser. No. 17/172,633 filed on Feb. 10, 2021. Application Ser. No. 17/172,633 is a Continuation of U.S. application Ser. No. 16/257,372, filed on Jan. 25, 2019, which claims the benefit of priority to U.S. Provisional Patent Application No. 62/623,758, filed on Jan. 30, 2018, U.S. Provisional Patent Application No. 62/654,827, filed on Apr. 9, 2018, and Korean Patent Application No. 10-2019-0003452 filed on Jan. 10, 2019 in the Korean Intellectual Property Office (KIPO), the entire contents of each of which are incorporated herein by reference.

BACKGROUND

1. Technical Field

The present disclosure relates generally to vehicle-to-everything (V2X) communication, and more specifically, to methods and apparatuses for transmitting and receiving control information including configuration information for transmission/reception in a V2X communication system.

2. Related Art

Various systems have been developed for processing of wireless data such as the fourth-generation (4G) communication system (e.g., Long Term Evolution (LTE) communication system or LTE-Advanced (LTE-A) communication system) and the fifth-generation (5G) communication system (e.g., New Radio (NR) communication system), which uses a frequency band higher than the frequency band of the 4G communication system. The 5G communication system can support Enhanced Mobile Broadband (eMBB) communications, Ultra-Reliable and Low-Latency communications (URLLC), massive Machine Type Communications (mMTC), and the like.

The 4G communication system and 5G communication system can support Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In many cellular communication systems, the V2X communications (e.g., C-V2X communications) may be performed based on "sidelink" communication technologies (e.g., Proximity-based Services (ProSe) communication technology, Device-to-Device (D2D) communication technology, or the like). For example, sidelink channels for vehicles participating in V2V communications can be established, and communications between the vehicles can be performed using the sidelink channels.

In cellular communication systems supporting V2X communications (e.g., C-V2X communication), a terminal located in a vehicle may perform the V2X communications using a resource allocated by a base station or a resource arbitrarily selected within a resource pool configured by the base station. The terminal may measure a channel busy ratio (CBR) periodically or when a preset event occurs, and may transmit a measurement result of the CBR to the base station. The base station may receive the measurement result of the CBR from the terminal, and identify a channel congestion based on the measurement result of the CBR. The base station may also adjust transmission parameters (e.g., modulation and coding scheme (MCS), maximum transmission power, range of retransmission counts per transport block (TB), etc.) based on channel congestion.

Meanwhile, in the V2X sidelink communication, a first terminal may transmit sidelink control information (SCI) including resource allocation information to a second terminal, and then may use a resource scheduled by the SCI to transmit data to the second terminal. The SCI and the data may be transmitted in the same subframe. Alternatively, when the SCI is transmitted in a subframe #n, the data may be transmitted in a subframe #(n+k). Here, n may be an integer greater than or equal to 0, and k may be an integer greater than or equal to 1.

Independently of the V2X sidelink communication between the first terminal and the second terminal, a third terminal may transmit an SCI and data to the first terminal based on the V2X sidelink communication scheme. The scheduling information included in the SCI of the third terminal may indicate that data is to be transmitted from the third terminal to the first terminal according to a predetermined periodicity. The SCI of the third terminal may not be received at the second terminal.

When data to be transmitted from the second terminal to the first terminal is generated, the second terminal may transmit an SCI and the data to the first terminal based on the V2X sidelink communication scheme. Problematically, a radio resource occupied by a V2X sidelink signal transmitted from the second terminal to the first terminal may be overlapped with a radio resource occupied by a V2X sidelink signal transmitted from the third terminal to the first terminal. Therefore, the first terminal may not receive both the V2X sidelink signal of the second terminal and the V2X sidelink signal of the third terminal.

SUMMARY

Accordingly, embodiments of the present disclosure provide a method and an apparatus for transmitting and receiving sidelink control information (SCI) including configuration information for transmission/reception in a V2X communication system.

According to embodiments of the present disclosure, an operation method of a first communication node located in a vehicle supporting a vehicle-to-everything (V2X) communication system may include: receiving, by the first communication node, control information including resource allocation information from a second communication node; receiving, by the first communication node, data from the second communication node through a radio resource indicated by the resource allocation information included in the control information; generating, by the first communication node, sidelink control information (SCI) including reception configuration information indicating the radio resource used for transmission of the data by the second communication node based on the resource allocation information; and transmitting, by the first communication node, the SCI to a third communication node.

The SCI may further include a format index indicating whether the SCI includes the reception configuration information.

The reception configuration information may include at least one of information indicating a transmission cycle of the data transmitted by the second communication node, information indicating a time resource through which the data is transmitted by the second communication node, and information indicating a frequency resource through which the data is transmitted by the second communication node.

The reception configuration information may further include information indicating a valid period during which data transmission from the third communication node to the first communication node is restricted.

The operation method may further include transmitting, by the first communication node, a first message to the second communication node, the first message including information indicating that the first communication node operates as a relay or a coordinator; and receiving, by the first communication node, a second message from the second communication node, the second message including information instructing to transmit the SCI including the reception configuration information. The first communication node may transmit the SCI in response to receiving the second message.

The first message and the second message may be transmitted and received according to a connection establishment procedure between the first communication node and the second communication node.

The operation method may further include transmitting, by the first communication node, a third message to the third communication node, the third message including information indicating that the SCI including the reception configuration information is to be transmitted by the first communication node. The first communication node may transmit the SCI after the third message is transmitted.

The third message may be a radio resource control (RRC) message, a message including a medium access control (MAC) control element (CE), or a message according to a PC5 signaling protocol.

Furthermore, in accordance with embodiments of the present disclosure, an operation method of a first communication node located in a vehicle supporting a vehicle-to-everything (V2X) communication system may include: receiving, by the first communication node, control information including resource allocation information from a second communication node; receiving, by the first communication node, first data from the second communication node through a radio resource indicated by the resource allocation information included in the control information; generating, by the first communication node, reception configuration information indicating the radio resource used for transmission of the first data based on the resource allocation information; generating, by the first communication node, transmission configuration information for second data to be transmitted to a third communication node; and transmitting, by the first communication node, sidelink control information (SCI) including the reception configuration information and the transmission configuration information to the third communication node.

The SCI may further include a format index indicating whether the SCI includes the reception configuration information and the transmission configuration information.

The reception configuration information includes at least one of information indicating a transmission cycle of the first data, information indicating a time resource through which the first data is transmitted, and information indicating a frequency resource through which the first data is transmitted.

The reception configuration information may include information indicating a valid period during which data transmission from the third communication node to the first communication node is restricted.

The transmission configuration information may include scheduling information used for transmission and reception of the second data.

The operation method may further include transmitting, by the first communication node, to the second communication node a first message including information requesting permission of transmission of the SCI including the reception configuration information; and receiving, by the first communication node, from the second communication node a second message including information instructing the first communication node to transmit the SCI including the reception configuration information. The first communication node may transmit the SCI in response to receiving the second message.

The operation method may further include transmitting, by the first communication node, a third message to the third communication node, the third message including information indicating that the SCI including the reception configuration information is to be transmitted by the first communication node. The first communication node may transmit the SCI after the third message is transmitted.

The third message may be a radio resource control (RRC) message, a message including a medium access control (MAC) control element (CE), or a message according to a PC5 signaling protocol.

Furthermore, in accordance with embodiments of the present disclosure, an operation method of a first communication node located in a vehicle supporting a vehicle-to-everything (V2X) communication system may include: receiving, by the first communication node, sidelink control information (SCI) from a second communication node; identifying, by the first communication node, a format index included in the SCI; and obtaining, by the first communication node, reception configuration information included in the SCI when the format index indicates that the SCI includes the reception configuration information. The reception configuration information may include information indicating a radio resource allocated for first data transmitted from a third communication node to the second communication node.

The operation method may further include, when the SCI includes scheduling information for second data to be transmitted from the second communication node to the first communication node, receiving, by the first communication node, the second data from the second communication node based on the scheduling information.

The operation method may further include, when the reception configuration information further includes information indicating a valid period during which transmission of third data is restricted, transmitting, by the first communication node, the third data to the second communication node after the valid period expires.

The operation method may further include receiving, by the first communication node, from the second communication node a message including information indicating that the SCI including the reception configuration information is to be transmitted by the first communication node. The first communication node may receive the SCI in response to receiving the message.

According to the embodiments of the present disclosure, a first terminal can generate a sidelink control information (SCI) including transmission configuration information and reception configuration information, and can transmit the generated SCI to a second terminal. The transmission configuration information may include resource allocation information for data to be transmitted from the first terminal to the second terminal, and the reception configuration information may include resource allocation information for data to be transmitted from a third terminal to the first terminal (or, from a base station to the first terminal). The second terminal can receive the SCI from the first terminal, and obtain the reception configuration information as well as the transmission configuration information from the received SCI.

When data to be transmitted from the second terminal to the first terminal is generated, the second terminal can transmit the SCI and the data to the first terminal in consideration of the resource allocation information indicated by the reception configuration information. In this case, a V2X sidelink signal transmitted from the second terminal to the first terminal may not collide with a V2X sidelink signal transmitted from the third terminal to the first terminal (or, a downlink signal from a base station to the first terminal). Therefore, the first terminal can receive both the V2X sidelink signal of the second terminal and the V2X sidelink signal of the third terminal (or, the downlink signal of the base station). As a result, the performance of the V2X communication system can be improved.

BRIEF DESCRIPTION OF DRAWINGS

Embodiments of the present disclosure will become more apparent by describing in detail embodiments of the present disclosure with reference to the accompanying drawings, in which.

Figure 1:
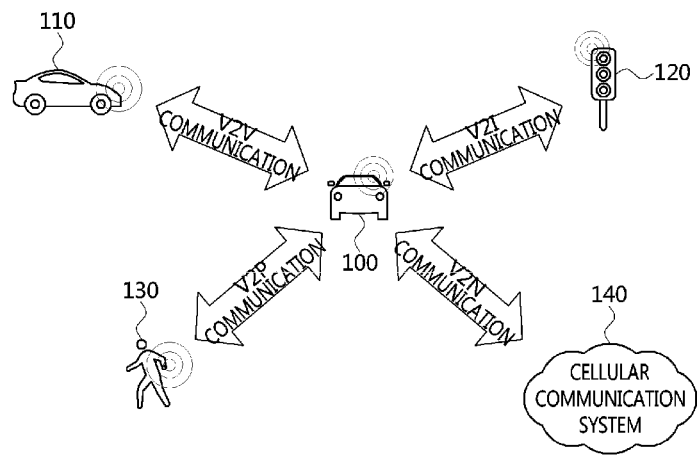
FIG. 1 is a conceptual diagram illustrating V2X communication scenarios.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. The control unit may control operation of units, modules, parts, or the like, as described herein. Moreover, it is understood that the below methods may be executed by an apparatus (e.g., communication node) comprising the control unit in conjunction with one or more other components, as would be appreciated by a person of ordinary skill in the art.

Furthermore, the control unit of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a conceptual diagram illustrating V2X communication scenarios.

As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." Here, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located in the vehicle 100) and a second vehicle 110 (e.g., a communication node located in the vehicle 110). Various driving information such as velocity, heading, time, position, and the like may be exchanged between the vehicles 100 and 110 through the V2V communications. For example, autonomous driving (e.g., platooning) may be supported based on the driving information exchanged through the V2V communications. The V2V communications supported in the cellular communication system 140 may be performed based on "sidelink" communication technologies (e.g., ProSe and D2D communication technologies, and the like). In this case, the communications between the vehicles 100 and 110 may be performed using at least one sidelink channel established between the vehicles 100 and 110.

The V2I communications may include communications between the first vehicle 100 (e.g., the communication node located in the vehicle 100) and an infrastructure (e.g., road side unit (RSU)) 120 located on a roadside. The infrastructure 120 may also include a traffic light or a street light which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 through the V2I communications. The V2I communications supported in the cellular communication system 140 may also be performed based on sidelink communication technologies (e.g., ProSe and D2D communication technologies, and the like). In this case, the communications between the vehicle 100 and the infrastructure 120 may be performed using at least one sidelink channel established between the vehicle 100 and the infrastructure 120.

The V2P communications may include communications between the first vehicle 100 (e.g., the communication node located in the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 through the V2P communications. The communication node located in the vehicle 100 or the communication node carried by the person 130 may generate an alarm indicating a danger by judging a dangerous situation based on the obtained driving information and movement information. The V2P communications supported in the cellular communication system 140 may be performed based on sidelink communication technologies (e.g., ProSe and D2D communication technologies, and the like). In this case, the communications between the communication node located in the vehicle 100 and the communication node carried by the person 130 may be performed using at least one sidelink channel established between the communication nodes.

The V2N communications may be communications between the first vehicle 100 (e.g., the communication node located in the vehicle 100) and a server connected through the cellular communication system 140. The V2N communications may be performed based on the 4G communication technology (e.g., LTE or LTE-A) or the 5G communication technology (e.g., NR). Also, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

Figure 2:
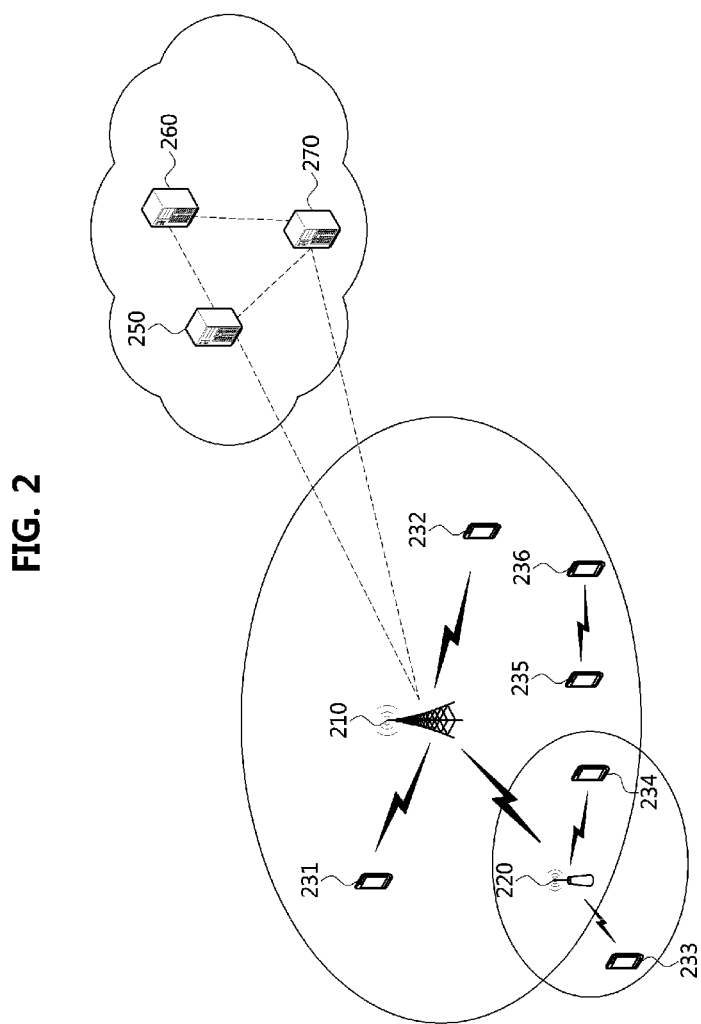
FIG. 2 is a conceptual diagram illustrating embodiments of a cellular communication system.

FIG. 2 is a conceptual diagram illustrating embodiments of a cellular communication system.

As shown in FIG. 2, a cellular communication system may include an access network, a core network, and the like. The access network may include a base station 210, a relay 220, User Equipments (UEs) 231 through 236, and the like. The UEs 231 through 236 may include communication nodes located in the vehicles 100 and 110 of FIG. 1, the communication node located in the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, or the core network constituted by the UPF 250, the SMF 260, and the AMF 270 may support the 4G communication technology as well as the 5G communication technology.

Also, when the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported through the V2X network slice configured in the core network.

The communication nodes (e.g., base station, relay, UE, S-GW, P-GW, MME, UPF, SMF, AMF, etc.) comprising the cellular communication system may perform communications by using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

The communication nodes (e.g., base station, relay, UE, S-GW, P-GW, MME, UPF, SMF, AMF, etc.) comprising the cellular communication system may be configured as follows.

Figure 3:
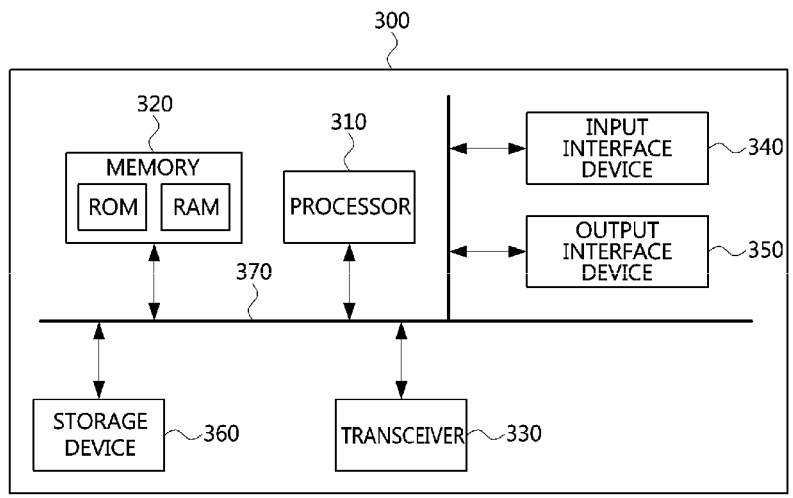
FIG. 3 is a conceptual diagram illustrating embodiments of a communication node constituting a cellular communication system.

FIG. 3 is a conceptual diagram illustrating embodiments of a communication node constituting a cellular communication system.

As shown in FIG. 3, a communication node 300 may comprise at least one processor 310, a memory 320, and a transceiver 330 connected to a network for performing communications. Also, the communication node 300 may further comprise an input interface device 340, an output interface device 350, a storage device 360, and the like. Each component included in the communication node 300 may communicate with each other as connected through a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may execute at least one instruction stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may include at least one of a volatile storage medium and a non-volatile storage medium. For example, the memory 320 may comprise at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may transmit signals received from the core network to the UEs 231 through 236 and the relay 220, and may transmit signals received from the UEs 231 through 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may communicate with the base station 210 after being connected to the base station 210.

The relay 220 may be connected to the base station 210 and may relay communications between the base station 210 and the UEs 233 and 234. That is, the relay 220 may transmit signals received from the base station 210 to the UEs 233 and 234, and may transmit signals received from the UEs 233 and 234 to the base station 210. The UE 234 may belong to both of the cell coverage of the base station 210 and the cell coverage of the relay 220, and the UE 233 may belong to the cell coverage of the relay 220. That is, the UE 233 may be located outside the cell coverage of the base station 210. The UEs 233 and 234 may be connected to the relay 220 by performing a connection establishment procedure with the relay 220. The UEs 233 and 234 may communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may perform operations corresponding to the base station 210 and operations supported by the base station 210. The UEs 233 and 234 may perform operations corresponding to the relays 220 and operations supported by the relays 220.

Here, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station a subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
|---|---|---|
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Meanwhile, a user plane protocol stack of the UEs (e.g., the UEs 235 and 236) performing sidelink communications may be configured as follows.

Figure 4:
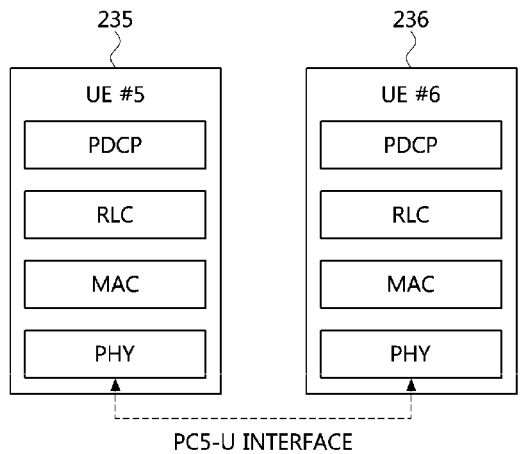
FIG. 4 is a block diagram illustrating embodiments of a user plane protocol stack of an UE performing sidelink communication.

FIG. 4 is a block diagram illustrating embodiments of a user plane protocol stack of an UE performing sidelink communication.

As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may comprise a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications and the layer 2-ID may be an ID configured for the V2X communications (e.g., V2X service). Also, in the sidelink communications, a hybrid automatic repeat request (HARQ) feedback operation may be supported, and an RLC acknowledged mode (RLC AM) or an RLC unacknowledged mode (RLC UM) may be supported.

Meanwhile, a control plane protocol stack of the UEs (e.g., the UEs 235 and 236) performing sidelink communications may be configured as follows.

Figure 5:
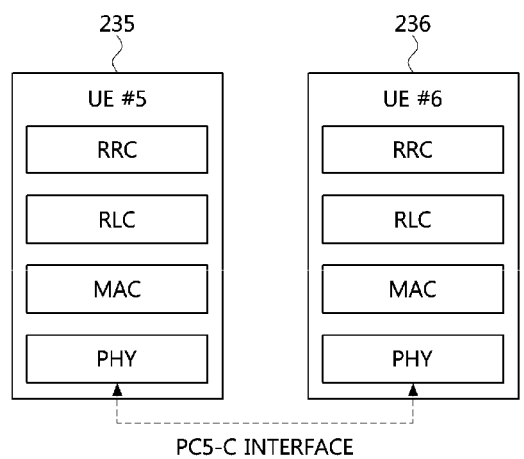
FIG. 5 is a block diagram illustrating a first embodiment of a control plane protocol stack of an UE performing sidelink communication.
Figure 6:
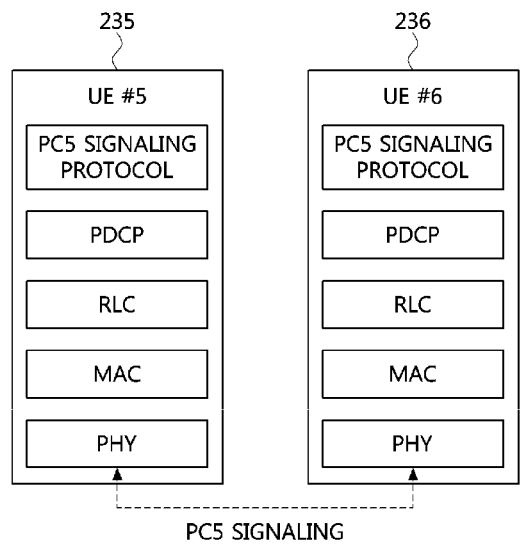
FIG. 6 is a block diagram illustrating a second embodiment of a control plane protocol stack of an UE performing sidelink communication.

FIG. 5 is a block diagram illustrating a first embodiment of a control plane protocol stack of an UE performing sidelink communication, and FIG. 6 is a block diagram illustrating a second embodiment of a control plane protocol stack of an UE performing sidelink communication.

As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). Also, a demodulation reference signal (DM-RS), a synchronization signal, or the like may be used in the sidelink communications between the UEs 235 and 236.

Meanwhile, a sidelink transmission mode (TM) may be classified into sidelink TMs 1 to 4 as shown below in Table 2.

TABLE 2

| Sidelink TM | Description |
|---|---|
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. In this case, the sidelink control information may be transmitted through resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. In this case, the sidelink control information may be transmitted through resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In this case, the sidelink data may be transmitted and received through resources scheduled by the base station 210. When the sidelink TM 4 is supported, the resource pool for transmitting and receiving sidelink data may be configured by a dedicated RRC signaling procedure or a broadcast RRC signaling procedure. In this case, the sidelink data may be transmitted and received through resources selected autonomously by the UE (e.g., UE 235 or 236) within the resource pool configured by the dedicated RRC signaling procedure or the broadcast RRC signaling procedure.

Next, methods for transmitting and receiving sidelink control information (SCI) including configuration information for transmission and reception in the communication system (e.g., cellular communication system) supporting the V2X communication as described above will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a first vehicle is described, a corresponding second vehicle may perform an operation corresponding to the operation of the first vehicle. Conversely, when an operation of the second vehicle is described, the corresponding first vehicle may perform an operation corresponding to the operation of the second vehicle. In the embodiments described below, the operation of the vehicle may be the operation of the communication node located in the vehicle.

A terminal located in a vehicle may operate as a relay. In this case, the terminal may perform V2X communication with a base station, and may perform V2X sidelink communication with other terminals. For example, the terminal operating as a relay may perform communication as follows.

Figure 7:
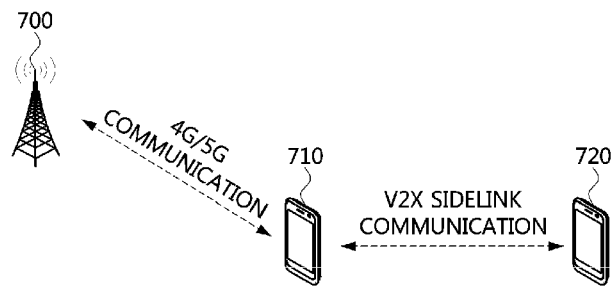
FIG. 7 is a conceptual diagram illustrating a first embodiment of a V2X communication system.

FIG. 7 is a conceptual diagram illustrating a first embodiment of a V2X communication system.

As shown in FIG. 7, a V2X communication system may comprise a base station 700, a first terminal 710, and a second terminal 720. The base station 700 may belong to the cellular communication system 140 shown in FIG. 1, the first terminal 710 may be located in the first vehicle 100 shown in FIG. 1, and the second terminal 720 may be located in the second vehicle 110 shown in FIG. 1. Each of the first terminal 710 and the second terminal 720 may support TM 3 or TM 4 defined in Table 2. Also, each of the first terminal 710 and the second terminal 720 may include the protocol stacks shown in FIGS. 4 to 6. Each of the base station 700, the first terminal 710 and the second terminal 720 may be configured to be the same as or similar to the communication node 300 shown in FIG. 3.

The first terminal 710 may be located within cell coverage of the base station 700 and may perform V2X communication with the base station 700. Also, the first terminal 710 may perform V2X sidelink communication with the second terminal 720. When data to be transmitted to the second terminal 720 is generated, the first terminal 710 may transmit an SCI including resource allocation information to the second terminal 720 and then use a resource scheduled by the SCI to transmit the data to the second terminal 720. The second terminal 720 may receive the SCI from the first terminal 710, and may receive the data from the first terminal 710 by monitoring the resource indicated by the received SCI. The SCI and the data may be transmitted in the same subframe. Alternatively, when the SCI is transmitted in a subframe #n, the data may be transmitted in a subframe #(n+k). Here, n may be an integer greater than or equal to 0, and k may be an integer greater than or equal to 1.

When data to be transmitted from the base station 700 to the first terminal 710 is generated, the base station 700 may transmit downlink control information (DCI) including resource allocation information to the first terminal 710, and may transmit the data to the first terminal 710 using a resource scheduled by the DCI. The first terminal 710 may receive the DCI from the base station 700 and receive the data from the base station 700 by monitoring the resource indicated by the received DCI. Also, the scheduling information included in the DCI of the base station 700 may indicate that the data is to be transmitted from the base station 700 to the first terminal 710 according to a predetermined periodicity. For example, the DCI of the base station 700 may be used for semi-persistent scheduling (SPS).

The second terminal 720 may be located outside the cell coverage of the base station 700 and may not receive the DCI of the base station 700. Therefore, the second terminal 720 may not know the resource used for communication between the base station 700 and the first terminal 710. In this situation, when data to be transmitted from the second terminal 720 to the first terminal 710 is generated, the second terminal 720 may transmit an SCI and the data to the first terminal 710 based on the V2X sidelink communication scheme. A radio resource occupied by a V2X sidelink signal transmitted from the second terminal 720 to the first terminal 710 may be overlapped with a radio resource occupied by a downlink signal transmitted from the base station 700 to the first terminal 710. Therefore, the first terminal 710 may not receive both the V2X sidelink signal of the second terminal 720 and the downlink signal of the base station 700.

Meanwhile, in a platooning scenario, terminals located in vehicles may perform V2X sidelink communications. For example, one or more terminals among the terminals may operate as a coordinator for the platooning, and the coordinator may perform V2X sidelink communications with other terminals. In the platooning scenario, the terminals may communicate as follows.

Figure 8:
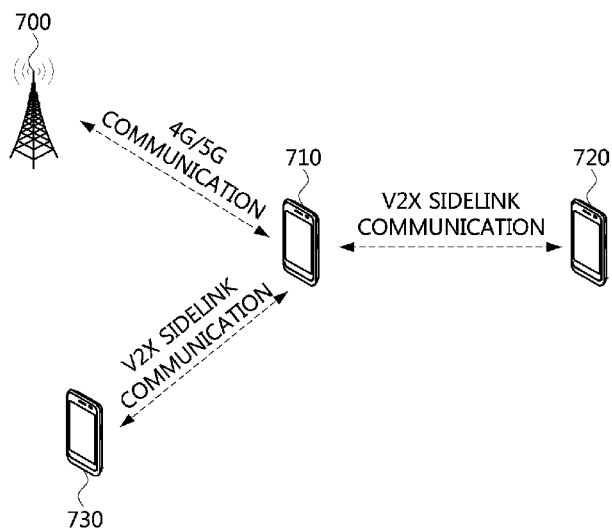
FIG. 8 is a conceptual diagram illustrating a second embodiment of a V2X communication system.

FIG. 8 is a conceptual diagram illustrating a second embodiment of a V2X communication system.

As shown in FIG. 8, a V2X communication system may comprise a base station 700, a first terminal 710, a second terminal 720, and a third terminal 730. The first terminal 710, the second terminal 720, and the third terminal 730 may be located in different vehicles participating in the platooning. Each of the first terminal 710, the second terminal 720, and the third terminal 730 may support TM 3 or TM 4 defined in Table 2. Also, each of the first terminal 710, the second terminal 720, and the third terminal 730 may include the protocol stacks shown in FIGS. 4 to 6. Each of the base station 700, the first terminal 710, the second terminal 720, and the third terminal 730 may be configured to be the same as or similar to the communication node 300 shown in FIG. 3.

The first terminal 710 may operate as a coordinator for the platooning, and may perform V2X sidelink communication with the second terminal 720 and the third terminal 730, respectively. When data to be transmitted from the first terminal 710 to the second terminal 720 is generated, the first terminal 710 may transmit an SCI including resource allocation information to the second terminal 720, and transmit the data to the second terminal 720 by using a resource scheduled by the SCI. The second terminal 720 may receive the SCI from the first terminal 710, and receive the data from the first terminal 710 by monitoring the resource indicated by the received SCI. The SCI and the data may be transmitted in the same subframe. Alternatively, the subframe in which the SCI is transmitted may be different from the subframe in which the data is transmitted.

When data to be transmitted from the third terminal 730 to the first terminal 710 is generated, the third terminal 730 may transmit an SCI including resource allocation information to the first terminal 710, and transmit the data to the first terminal 710 by using a resource scheduled by the SCI. The first terminal 710 may receive the SCI from the third terminal 730, and receive the data from the third terminal 730 by monitoring the resource indicated by the received SCI. The scheduling information included in the SCI of the third terminal 730 may indicate that the data is to be transmitted from the third terminal 730 to the first terminal 710 according to a predetermined periodicity. For example, the SCI of the third terminal 730 may be used for SPS.

The second terminal 720 may be located outside the coverage of the third terminal 730 and may not receive the SCI of the third terminal 730. Therefore, the second terminal 720 may not know the resource used for communication between the third terminal 730 and the first terminal 710. In this situation, when data to be transmitted from the second terminal 720 to the first terminal 710 is generated, the second terminal 720 may transmit an SCI and the data to the first terminal 710 based on the V2X sidelink communication scheme. A radio resource occupied by a V2X sidelink signal transmitted from the second terminal 720 to the first terminal 710 may be overlapped with a radio resource occupied by a V2X sidelink signal transmitted from the third terminal 730 to the first terminal 710. Therefore, the first terminal 710 may not receive both the V2X sidelink signal of the second terminal 720 and the V2X sidelink signal of the third terminal 730.

In order to solve the problems of the examples shown in FIGS. 7 and 8, the first terminal 710 may generate an SCI including the resource allocation information included in the DCI received from the base station 700 or the SCI received from the third terminal 730, and transmit the generated SCI to the second terminal 720. A transmission procedure of the SCI including the resource allocation information included in the DCI or SCI received from another communication node (e.g., the base station 700 or the third terminal 730) may be triggered by the base station 700. A method for triggering the SCI transmission procedure may be as follows.

Figure 9:
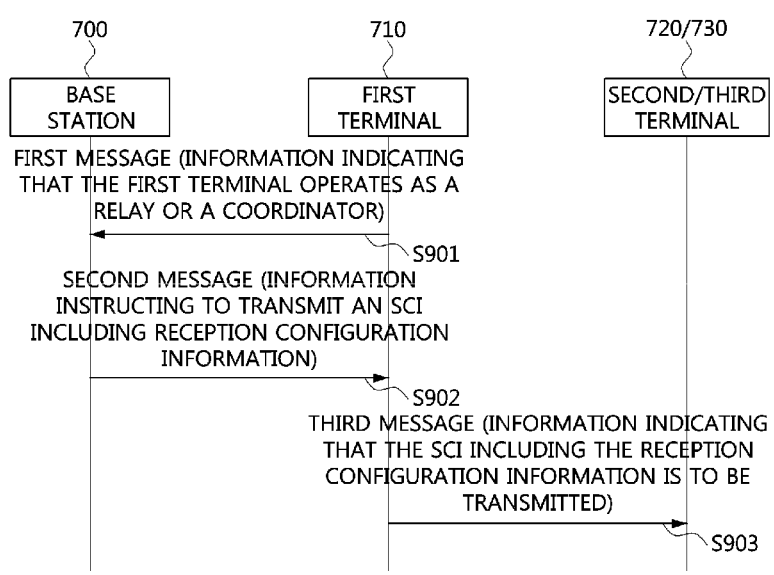
FIG. 9 is a sequence chart illustrating a first embodiment of a method for triggering an SCI transmission/reception procedure in a V2X communication system.

FIG. 9 is a sequence chart illustrating a first embodiment of a method for triggering an SCI transmission/reception procedure in a V2X communication system.

As shown in FIG. 9, a V2X communication system may comprise a base station 700, a first terminal 710, a second terminal 720, and a third terminal 730. The base station 700, the first terminal 710, the second terminal 720, and the third terminal 730 may be the base station 700, the first terminal 710, the second terminal 720, and the third terminal 730 which are shown in FIG. 8. Each of the first terminal 710, the second terminal 720, and the third terminal 730 may support TM 3 or TM 4 defined in Table 2. Also, each of the first terminal 710, the second terminal 720, and the third terminal 730 may include the protocol stacks shown in FIGS. 4 to 6. Each of the base station 700, the first terminal 710, the second terminal 720, and the third terminal 730 may be configured to be the same as or similar to the communication node 300 shown in FIG. 3.

The first terminal 710 operating as a relay or a coordinator for platooning may generate a first message (e.g., RRC message) including information indicating that the first terminal 710 operates as a relay or a coordinator for platooning. Alternatively, the first message may include information requesting permission of transmission of an SCI including reception configuration information. The first terminal 710 may transmit the first message to the base station 700 (S901). The first message may be transmitted according to a connection establishment procedure between the first terminal 710 and the base station 700. In this case, the operation state of the first terminal 710 may be an RRC_idle state. Alternatively, the first message may be transmitted by the first terminal 710 operating in an RRC_connected state or an RRC inactive state. Here, the first message may be sidelink UE information.

The base station 700 may receive the first message from the first terminal 710 and determine that the first terminal 710 operates as a relay or a coordinator for platooning based on the information included in the received first message. Alternatively, the base station 700 may determine that the transmission of the SCI including the reception configuration information is requested. In this case, in order to solve the problems of the examples shown in FIG. 7 or 8, the base station 700 may transmit to the first terminal 710 a second message including information instructing to transmit the SCI including the reception configuration information (S902). The first terminal 710 may receive the second message from the base station, and determine that the transmission of the SCI including the reception configuration information is permitted based on the information included in the received message. The second message may be an RRC message, a message including a MAC control element (CE), or a message including a DCI.

The reception configuration information may be configuration information used by the first terminal 710 to receive data from another communication node (e.g., the base station 700, the second terminal 720, or the third terminal 730). For example, the reception configuration information may be the resource allocation information included in the DCI received by the first terminal 710 from the base station 700. Alternatively, the reception configuration information may be the resource allocation information included in the SCI received by the first terminal 710 from the second terminal 720 or the third terminal 730. The transmission configuration information may be configuration information used by the first terminal 710 to transmit data to another communication node (e.g., the first terminal 720 or the third terminal 730).

Also, the first terminal 710 may generate a third message including information indicating that the SCI including the reception configuration information is to be transmitted, and transmit the generated third message to other terminals (e.g., the second terminal 720 and the third terminal 730) (S903). The second terminal 720 and the third terminal 730 may receive the third message from the first terminal 710, and based on the information included in the received third message, the second terminal 720 may determine that the SCI including the reception configuration information is to be transmitted based on the information included in the received third message. Here, the third message may be an RRC message, a message including a MAC CE, or a signaling message according to the PC5 signaling protocol.

Meanwhile, in the platooning scenario, a platooning identifier (PID) for the first terminal 710 operating as a coordinator may be configured. The PID may be configured according to the connection establishment procedure between the first terminal 710 and the base station 700. For example, the base station 700 may set the PID for the first terminal 710 and transmit an RRC message including the set PID to the first terminal 710. The first terminal 710 may obtain the PID by receiving the RRC message from the base station 700. The first terminal 710 may notify the PID to other terminals participating in the platooning (e.g., the second terminal 720 and the third terminal 730). For example, the PID may be commonly used in the terminals (e.g., the first terminal 710, the second terminal 720, and the third terminal 730) participating in the platooning. The PID may be used as an area identifier (AID).

Figure 10:
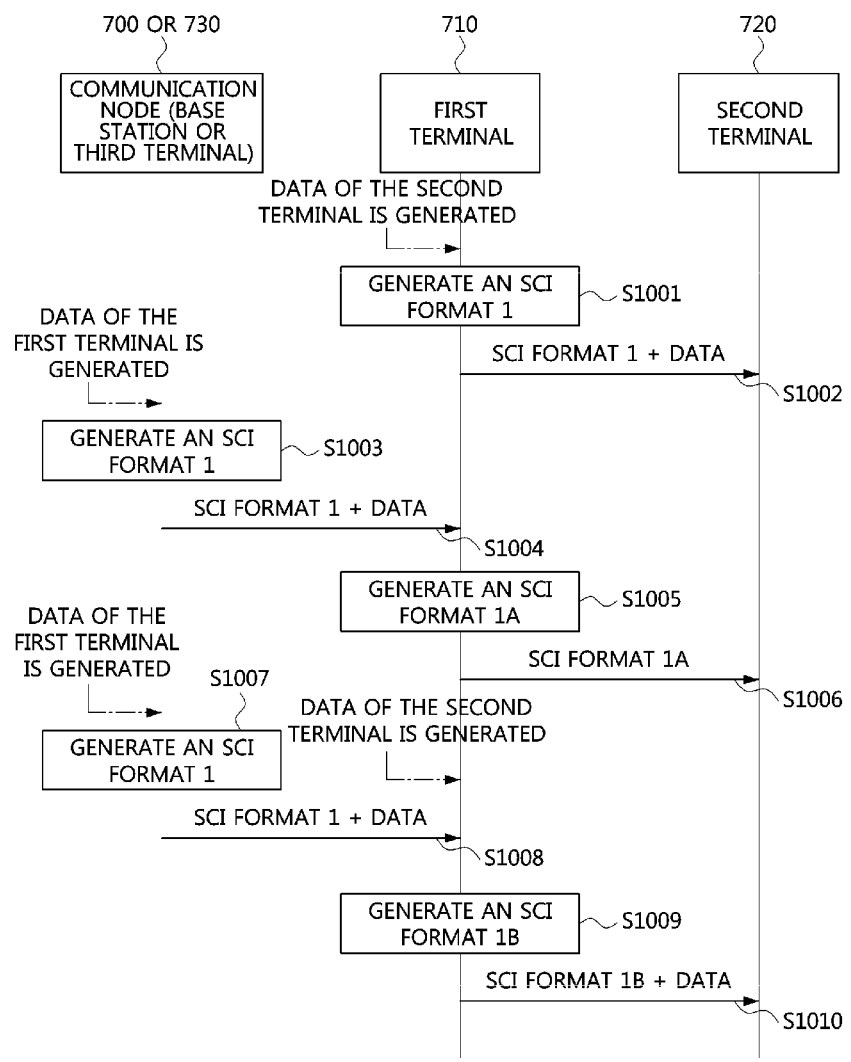
FIG. 10 is a sequence chart illustrating a first embodiment of an SCI transmission and reception method in a V2X communication system.

In the embodiment shown in FIG. 10, the SCI may further include a PID, and the terminal receiving the SCI may compare its PID with the PID included in the SCI. When the PID of the terminal and the PID included in the SCI are the same, the terminal may perform V2X sidelink communication using the information included in the SCI. On the other hand, when the PID of the terminal and the PID included in the SCI are different from each other, the terminal may discard the SCI. Also, in the platooning scenario, a sequence of a reference signal or a discovery signal may be generated based on the PID.

Meanwhile, when the transmission of the SCI including the reception configuration information is permitted, the first terminal 710 may transmit the SCI including the reception configuration information. Alternatively, regardless of whether the transmission of the SCI including the reception configuration information is permitted or not, the first terminal 710 may transmit the SCI including the reception configuration information. In this case, the triggering method shown in FIG. 9 may not be performed.

A format of the SCI may be configured according to whether or not the reception configuration information is included. For example, the SCI format may be configured based on Table 3 below.

TABLE 3

|  | Format index | Reception configuration information | Transmission configuration information |
| --- | --- | --- | --- |
| SCI format 1 | 00 | Not included | Included |
| SCI format 1A | 01 | Included | Not included |
| SCI format 1B | 10 | Included | Included |

A format index for each of SCI format 1, SCI format 1A, and SCI format 1B may be set. For example, the format index of the SCI format 1 may be set to '00', the format index of the SCI format 1A may be set to '01', and the format index of the SCI format 1B may be set to '10'. In this case, the SCI having the format 1 may include the format index set to '00', the SCI having the format 1A may include the format index set to '01' and the SCI having the format 1B may include the format index set to '10'.

In the V2X communication system, a transmission and reception method of the SCI including the reception configuration information may be as follows.

FIG. 10 is a sequence chart illustrating a first embodiment of an SCI transmission and reception method in a V2X communication system.

As shown in FIG. 10, a V2X communication system may comprise a base station 700, a first terminal 710, a second terminal 720, and a third terminal 730. The base station 700, the first terminal 710, the second terminal 720, and the third terminal 730 may be the base station 700, the first terminal 710, the second terminal 720, and the third terminal 730 which are shown in FIG. 8. Each of the first terminal 710, the second terminal 720, and the third terminal 730 may support TM 3 or TM 4 defined in Table 2. Also, each of the first terminal 710, the second terminal 720, and the third terminal 730 may include the protocol stacks shown in FIGS. 4 to 6. Each of the base station 700, the first terminal 710, the second terminal 720, and the third terminal 730 may be configured to be the same as or similar to the communication node 300 shown in FIG. 3.

When data to be transmitted from the first terminal 710 to the second terminal 720 is generated, the first terminal 710 may generate an SCI format 1 (e.g., the SCI format 1 defined in Table 3) including transmission configuration information for the data of the second terminal 720 (S1001). The SCI format 1 (e.g., transmission configuration information) may include one or more parameters defined in Table 4 below.

TABLE 4

|  | Parameters |
| --- | --- |
| SCI format 1 | Format index<br>Priority<br>Resource reservation<br>Frequency resource location<br>Time interval<br>Modulation and coding scheme (MCS)<br>Retransmission index<br>Valid period |

The 'format index' of Table 4 may be set to '00'. The 'frequency resource location' of Table 4 may indicate the location of the frequency resource for initial transmission and retransmission. The 'time interval' of Table 4 may indicate a time interval between the initial transmission and the retransmission. The 'valid period' of Table 4 may indicate a period during which data transmission is restricted. The 'valid period' may start at a transmission time of the SCI format 1.

The first terminal 710 may transmit the SCI format 1 and the data to the second terminal 720 (S1002). A subframe in which the SCI format 1 is transmitted may be the same as a subframe in which data scheduled by the SCI format 1 is transmitted. Alternatively, a subframe in which the SCI format 1 is transmitted may be different from a subframe in which data scheduled by the SCI format 1 is transmitted. The second terminal 720 may receive the SCI format 1 from the first terminal 710, and identify the format index included in the received SCI format 1. When the format index is set to '00', the second terminal 720 may determine that the SCI format 1 includes the transmission configuration information, and may receive the data based on the transmission configuration information included in the SCI format 1.

In addition, when the SCI format 1 includes the valid period, the second terminal 720 may not transmit data to the first terminal 710 during the valid period indicated by the SCI format 1. That is, when data to be transmitted from the second terminal 720 to the first terminal 710 is generated, the second terminal 720 may transmit the data to the first terminal 710 after the valid period indicated by the SCI format 1 expires.

Meanwhile, when data to be transmitted from a communication node (e.g., the base station 700 or the third terminal 730) to the first terminal 710 is generated, the communication node 700 or 730 may generate an SCI format 1 including transmission configuration information for the data of the first terminal 710 (S1003). The SCI format 1 (e.g., transmission configuration information) may include one or more parameters defined in Table 4.

The communication node 700 or 730 may transmit the SCI format 1 and the data to the first terminal 710 (S1004). A subframe in which the SCI format 1 is transmitted may be the same as a subframe in which data scheduled by the SCI format 1 is transmitted. Alternatively, a subframe in which the SCI format 1 is transmitted may be different from a subframe in which data scheduled by the SCI format 1 is transmitted. The first terminal 710 may receive the SCI format 1 from the communication node 700 or 730, and identify the format index included in the received SCI format 1. When the format index is set to '00', the first terminal 710 may determine that the SCI format 1 includes the transmission configuration information, and may receive the data based on the transmission configuration information included in the SCI format 1.

In addition, when the SCI format 1 includes the valid period, the first terminal 710 may not transmit data to the communication node 700 or 730 during the valid period indicated by the SCI format 1. That is, when data to be transmitted from the first terminal 710 to the communication node 700 or 730 is generated, the first terminal 710 may transmit the data to the communication node 700 or 730 after the valid period indicated by the SCI format 1 expires.

Also, the first terminal 710 may generate reception configuration information based on resource allocation information of the data among the information included in the SCI format 1 received from the communication node 700 or 730. For example, the first terminal 710 may generate information (e.g., transmission cycle, time resource, frequency resource) indicating a time-frequency resource used for the data transmitted from the communication node 700 or 730 to the first terminal 710 based on the information (e.g., 'resource reservation', 'frequency resource location', and 'time interval') included in the SCI format 1, and generate the reception configuration information including the information indicating the time-frequency resource.

The first terminal 710 may generate an SCI format 1A including the reception configuration information (S1005). When there is no data to be transmitted from the first terminal 710 to the second terminal 720, the SCI format 1A may be generated instead of the SCI format 1B. The SCI format 1A may include one or more parameters defined in Table 5 below.

TABLE 5

| | Parameters |
|---|---|
| SCI format 1A | Format index<br>Transmission cycle<br>Time resource<br>Frequency resource<br>Valid period |

The SCI format 1A may include a resource reservation field, a frequency resource location field, and a time interval field. In this case, the transmission cycle defined in Table 5 may be indicated by the resource reservation field, the time resource defined in Table 5 may be indicated by the time interval field, and the frequency resource defined in Table 5 may be indicated by the frequency resource location field.

The first terminal 710 may transmit the SCI format 1A to the second terminal 720 (S1006). That is, the SCI format 1A may be transmitted without data. The second terminal 720 may receive the SCI format 1A from the first terminal 710, and identify the format index included in the received SCI format 1A. When the format index is set to '01', the second terminal 720 may determine that the SCI format 1A includes the reception configuration information, and may identify the reception configuration information included in the SCI format 1A.

When data to be transmitted from the second terminal 720 to the first terminal 710 is generated, the second terminal 720 may transmit the data to the first terminal 710 by using a resource not overlapped with the time-frequency resource indicated by the SCI format 1A. For example, when there are insufficient available resources in a frequency band (e.g., a channel) to which a frequency resource indicated by the SCI format 1A belongs, the second terminal 720 may transmit the data to the first terminal 710 by using a frequency band different from the frequency band indicated by the SCI format 1A. Also, when the SCI format 1A includes the valid period, the second terminal 720 may not transmit the data to the first terminal 710 during the valid period indicated by the SCI format 1A. That is, when data to be transmitted from the second terminal 720 to the first terminal 710 is generated, the second terminal 720 may transmit the data to the first terminal 710 after the valid period indicated by the SCI format 1A expires.

Meanwhile, when data to be transmitted from the communication node 700 or 730 to the first terminal 710 is generated, the communication node 700 or 730 may generate an SCI format 1 including transmission configuration information for the data of the first terminal 710 (S1007). The SCI format 1 (e.g., transmission configuration information) may include one or more parameters defined in Table 4.

The communication node 700 or 730 may transmit the SCI format 1 and the data to the first terminal 710 (S1008). A subframe in which the SCI format 1 is transmitted may be the same as a subframe in which data scheduled by the SCI format 1 is transmitted. Alternatively, a subframe in which the SCI format 1 is transmitted may be different from a subframe in which data scheduled by the SCI format 1 is transmitted. The first terminal 710 may receive the SCI format 1 from the communication node 700 or 730, and identify the format index included in the received SCI format 1. When the format index is set to '00', the first terminal 710 may determine that the SCI format 1 includes the transmission configuration information, and may receive the data based on the transmission configuration information included in the SCI format 1.

In addition, when the SCI format 1 includes the valid period, the first terminal 710 may not transmit data to the communication node 700 or 730 during the valid period indicated by the SCI format 1. That is, when data to be transmitted from the first terminal 710 to the communication node 700 or 730 is generated, the first terminal 710 may transmit the data to the communication node 700 or 730 after the valid period indicated by the SCI format 1 expires.

When the SCI format 1 is received from the communication node 700 or 730 and data to be transmitted from the first terminal 710 to the second terminal 720 is generated, the first terminal may generate an SCI format 1B including transmission configuration information and reception configuration information (S1009). The transmission configuration information may be configuration information used by the first terminal 710 to transmit the data to the second terminal 720. The transmission configuration information may include one or more parameters defined in Table 4.

The first terminal 710 may generate reception configuration information based on resource allocation information of the data among the information included in the SCI format 1 received from the communication node 700 or 730. For example, the first terminal 710 may generate information (e.g., transmission cycle, time resource, frequency resource) indicating a time-frequency resource used for the data transmitted from the communication node 700 or 730 to the first terminal 710 based on the information (e.g., 'resource reservation', 'frequency resource location', and 'time interval') included in the SCI format 1, and generate the reception configuration information including the information indicating the time-frequency resource.

The SCI format 1B including the transmission configuration information and the reception configuration information may include one or more parameters defined in Table 6 below.

TABLE 6

| | | Parameters |
|---|---|---|
| SCI format 1B | Transmission configuration information | Format index Priority Resource reservation Frequency resource location Time interval Modulation and coding scheme (MCS) Retransmission index |
| | Reception configuration information | Transmission cycle Time resource Frequency resource Valid period |

The SCI format 1B may include fields used for indicating transmission configuration information and fields used for indicating reception configuration information (hereinafter referred to as 'reception configuration fields'). The reception configuration fields may include a resource reservation field, a frequency resource location field, and a time interval field. The resource reservation field included in the reception configuration fields may be used to indicate the transmission cycle defined in Table 6. The frequency resource location field included in the reception configuration fields may be used to indicate the frequency resource defined in Table 6. The time interval field included in the reception configuration fields may be used to indicate the time resource defined in Table 6.

Alternatively, the resource reservation field may be omitted in the reception configuration fields. In that case, the information indicating the transmission cycle as the reception configuration information may be included in the resource reservation field of the transmission configuration fields (e.g., transmission configuration information) belonging to the SCI format 1B. In that case, the resource reservation field included in the transmission configuration fields may indicate the transmission cycle belonging to the transmission configuration information as well as the transmission cycle belonging to the reception configuration information. Alternatively, the time interval field may be omitted in the reception configuration fields. In that case, the information indicating the time resource as the reception configuration information may be included in the time interval field of the transmission configuration fields belonging to the SCI format 1B. In that case, the time interval field included in the transmission configuration fields may indicate the time resource belonging to the transmission configuration information as well as the time resource belonging to the reception configuration information.

The 'transmission cycle' included in the SCI format 1B may explicitly indicate a transmission cycle of data transmitted from the communication node 700 or 730 to the first terminal 710. Alternatively, the 'transmission cycle' included in the SCI format 1B may indicate an offset between a transmission cycle of data transmitted from the first terminal 710 to the second terminal 720 and a transmission cycle of data transmitted from the communication node 700 or 730 to the first terminal 710.

The 'time resource' included in the SCI format 1B may explicitly indicate a time resource for data transmitted from the communication node 700 or 730 to the first terminal 710. Alternatively, the 'time resource' included in the SCI format 1B may indicate an offset between a time resource (e.g., a start time point or an end time point of the time resource) for data transmitted from the first terminal 710 to the second terminal 720 and a time resource (e.g., a start time point or an end time point of the time resource) for data transmitted from the communication node 700 or 730 to the first terminal 710. In this case, the SCI format 1B may further include information indicating a duration of the time resource for the data transmitted from the communication node 700 or 730 to the first terminal 710. Therefore, the time resource for the data transmitted from the communication node 700 or 730 to the first terminal 710 may be identified based on the offset and the duration for the time resource included in the SCI format 1B.

The 'frequency resource' included in the SCI format 1B may explicitly indicate a frequency resource for data transmitted from the communication node 700 or 730 to the first terminal 710. Alternatively, the 'frequency resource' included in the SCI format 1B may indicate an offset between a frequency resource (e.g., a start position or an end position of the frequency resource) for data transmitted from the first terminal 710 to the second terminal 720 and a frequency resource (e.g., a start position or an end position of the frequency resource) for data transmitted from the communication node 700 or 730 to the first terminal 710. In this case, the SCI format 1B may further include information indicating the size of the frequency resource (e.g., bandwidth) for the data transmitted from the communication node 700 or 730 to the first terminal 710. Therefore, the frequency resource for the data transmitted from the communication node 700 or 730 to the first terminal 710 may be identified based on the offset and the bandwidth for the frequency resource included in the SCI format 1B.

The first terminal 710 may transmit the SCI format 1B and the data to the second terminal 720 (S1010). A subframe in which the SCI format 1B is transmitted may be the same as a subframe in which data scheduled by the SCI format 1B is transmitted. Alternatively, a subframe in which the SCI format 1B is transmitted may be different from a subframe in which data scheduled by the SCI format 1B is transmitted. The second terminal 720 may receive the SCI format 1B from the first terminal 710, and identify the format index included in the received SCI format 1B. When the format index is set to '10', the second terminal 720 may determine that the SCI format 1B includes the transmission configuration information and the reception configuration information based on the format index.

The second terminal 720 may receive the data based on the transmission configuration information included in the SCI format 1B. Also, the second terminal 720 may identify the reception configuration information included in the SCI format 1B. When data to be transmitted from the second terminal 720 to the first terminal 710 is generated, the second terminal 720 may transmit the data to the first terminal 710 by using a resource not overlapped with the time-frequency resource indicated by the reception configuration information included in the SCI format 1B. For example, when there are insufficient available resources in a frequency band (e.g., a channel) to which a frequency resource indicated by the reception configuration information included in the SCI format 1B belongs, the second terminal 720 may transmit the data to the first terminal 710 by using a frequency band different from the frequency band indicated by the SCI format 1B.

Also, when the SCI format 1B includes the valid period, the second terminal 720 may not transmit the data to the first terminal 710 during the valid period indicated by the SCI format 1B. That is, when data to be transmitted from the second terminal 720 to the first terminal 710 is generated, the second terminal 720 may transmit the data to the first terminal 710 after the valid period indicated by the SCI format 1B expires.

While the embodiments of the present disclosure and their advantages have been described in detail, it should be understood that various changes, substitutions and alterations may be made herein without departing from the scope of the present disclosure.

What is claimed is:

1. A first user equipment (UE) comprising:
a processor,
wherein the processor causes the first UE to:
receive, from a second UE, sidelink control information (SCI) including first resource allocation information which indicates a first sidelink resource set used for a first sidelink communication for a third UE;
select a sidelink resource excluding the first sidelink resource set indicated by the SCI; and
transmit, to the second UE, sidelink data using the selected sidelink resource.

2. The first UE according to claim 1, wherein the SCI further includes a field indicating that the SCI includes the first resource allocation information for the first sidelink communication for the third UE.

3. The first UE according to claim 1, wherein the SCI further includes second resource allocation information which indicates a second sidelink resource set used for a second sidelink communication between the first UE and the second UE.

4. The first UE according to claim 3, wherein the selected sidelink resource belongs to the second sidelink resource set.

5. The first UE according to claim 1, wherein the first sidelink resource set includes time and/or frequency resources for the first sidelink communication.

6. The first UE according to claim 1, wherein when the third UE is the first UE, the first sidelink communication is sidelink transmission from the second UE to the first UE, and the selected sidelink resource is used for sidelink transmission from the first UE to the second UE.

7. The first UE according to claim 1, wherein a format of the SCI indicates that the SCI is not scheduling SCI for the sidelink data.

8. A second user equipment (UE) comprising:
a processor,
wherein the processor causes the second UE to:
transmit, to a first UE, sidelink control information (SCI) including first resource allocation information which indicates a first sidelink resource set used for a first sidelink communication for a third UE;
identify a sidelink resource excluding the first sidelink resource set indicated by the SCI; and
perform a monitoring operation on the identified sidelink resource to receive sidelink data from the first UE.

9. The second UE according to claim 8, wherein the SCI further includes a field indicating that the SCI includes the first resource allocation information for the first sidelink communication for the third UE.

10. The second UE according to claim 8, wherein the SCI further includes second resource allocation information which indicates a second sidelink resource set used for a second sidelink communication between the first UE and the second UE.

11. The second UE according to claim 10, wherein the identified sidelink resource belongs to the second sidelink resource set.

12. The second UE according to claim 8, wherein when the third UE is the first UE, the first sidelink communication is sidelink transmission from the second UE to the first UE, and the identified sidelink resource is used for sidelink transmission from the first UE to the second UE.

13. The second UE according to claim 8, wherein a format of the SCI indicates that the SCI is not scheduling SCI for the sidelink data.

14. A first user equipment (UE) comprising:
a processor,
wherein the processor causes the first UE to:
receive, from a second UE, sidelink control information (SCI) including first resource allocation information which indicates a first sidelink resource set used for a first sidelink communication between the second UE and a third UE;
select a sidelink resource excluding the first sidelink resource set indicated by the SCI; and
transmit, to the second UE, sidelink data using the selected sidelink resource.

15. A second user equipment (UE) comprising:
a processor,
wherein the processor causes the second UE to:
transmit, to a first UE, sidelink control information (SCI) including first resource allocation information which indicates a first sidelink resource set used for a first sidelink communication between the second UE and a third UE;
identify a sidelink resource excluding the first sidelink resource set indicated by the SCI; and
perform a monitoring operation on the identified sidelink resource to receive sidelink data from the first UE.

16. A first user equipment (UE) comprising:
a processor,
wherein the processor causes the first UE to:
receive control information including resource allocation information from a second UE;
receive, data from the second UE through a radio resource indicated by the resource allocation information included in the control information;
generate sidelink control information (SCI) including reception configuration information indicating the radio resource used for transmission of the data by the second UE based on the resource allocation information; and
transmit the SCI to a third UE,
wherein the radio resource indicated by the reception configuration information is used for communications between the first UE and the second UE, and
wherein the radio resource indicated by the reception configuration information is not used for communications between the first UE and the third UE.

17. A first user equipment (UE) comprising:
a processor,
wherein the processor causes the first UE to:
receive sidelink control information (SCI) from a second UE;
identify a format index included in the SCI; and
obtain reception configuration information included in the SCI when the format index indicates that the SCI includes the reception configuration information,
wherein the reception configuration information includes information indicating a radio resource allocated for first data transmitted from a third UE to the second UE,
wherein the radio resource indicated by the reception configuration information is used for communications between the second UE and the third UE, and
wherein the radio resource indicated by the reception configuration information is not used for communications between the second UE and the first UE.

* * * * *